Dec. 28, 1954      J. D'A. CLARK      2,698,271
PRODUCTION OF THICK, LAMINATED, FIBROUS STRUCTURES
Filed Aug. 13, 1949      3 Sheets-Sheet 1
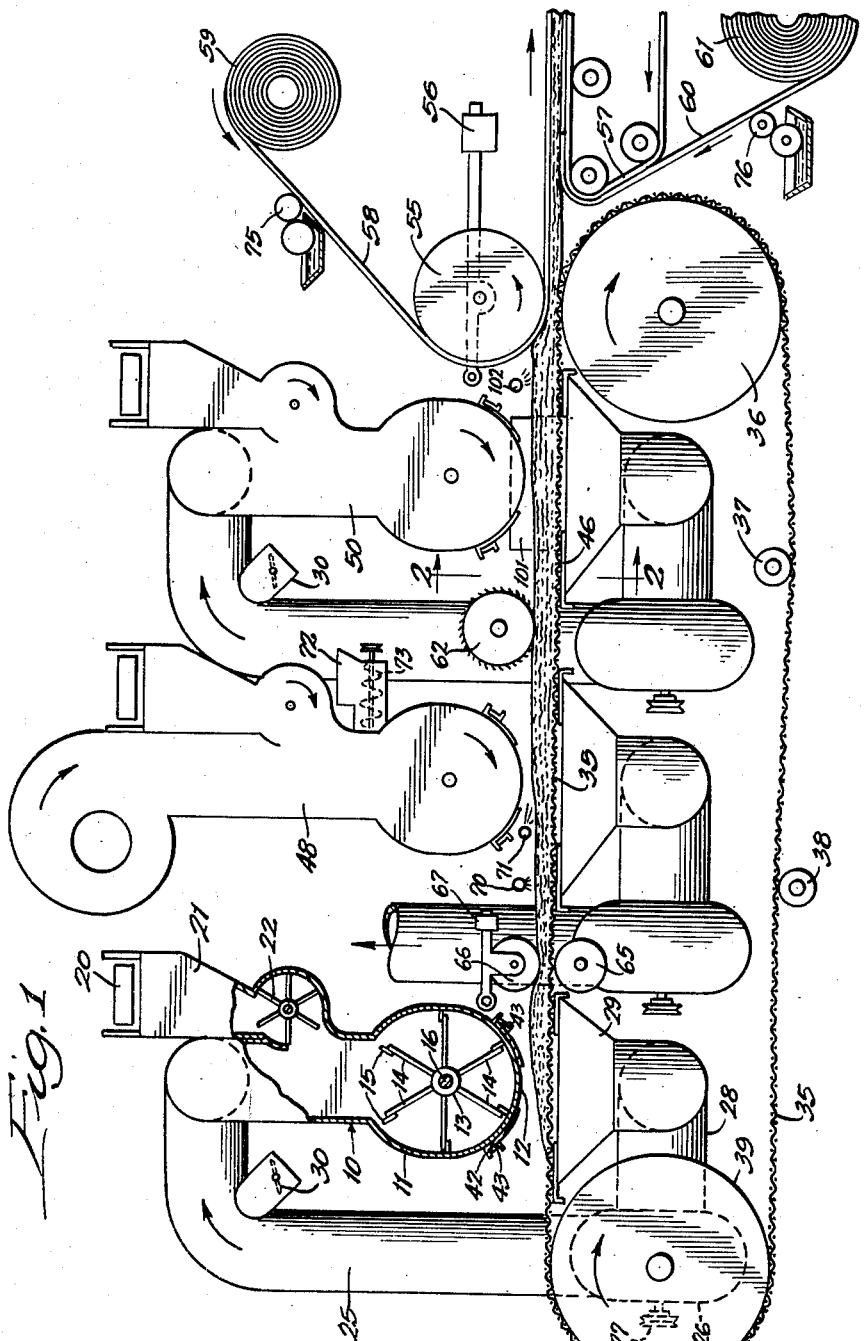
INVENTOR:
James d'A. Clark.
BY
ATTORNEYS Dec. 28, 1954  J. D'A. CLARK  2,698,271
PRODUCTION OF THICK, LAMINATED, FIBROUS STRUCTURES
Filed Aug. 13, 1949  3 Sheets-Sheet 2
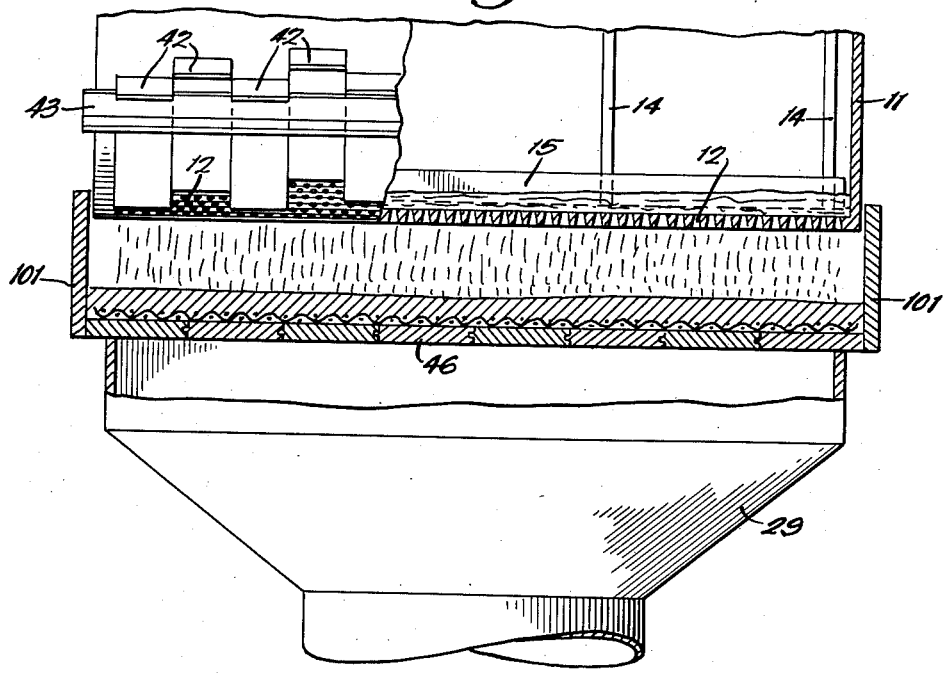
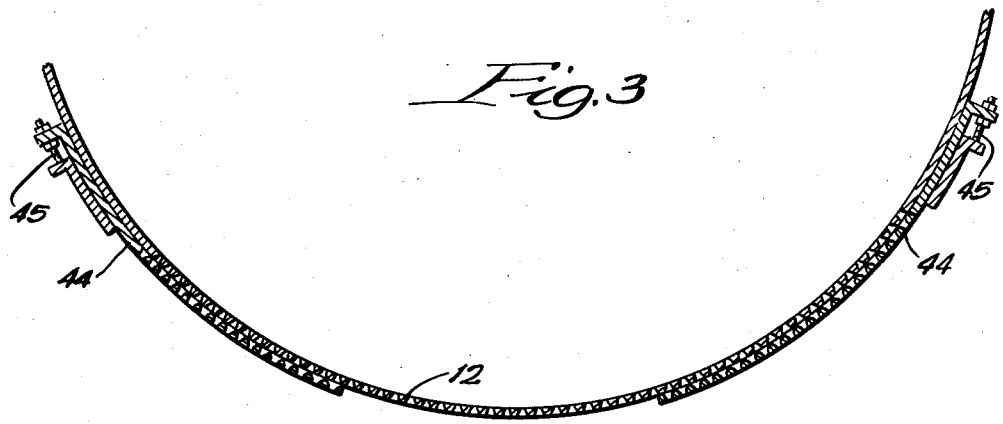
INVENTOR:
James d'A. Clark,
BY Dawson, Ooms, Booth & Spangenberg,
ATTORNEYS.

Dec. 28, 1954   J. D'A. CLARK   2,698,271
PRODUCTION OF THICK, LAMINATED, FIBROUS STRUCTURES
Filed Aug. 13, 1949   3 Sheets-Sheet 3
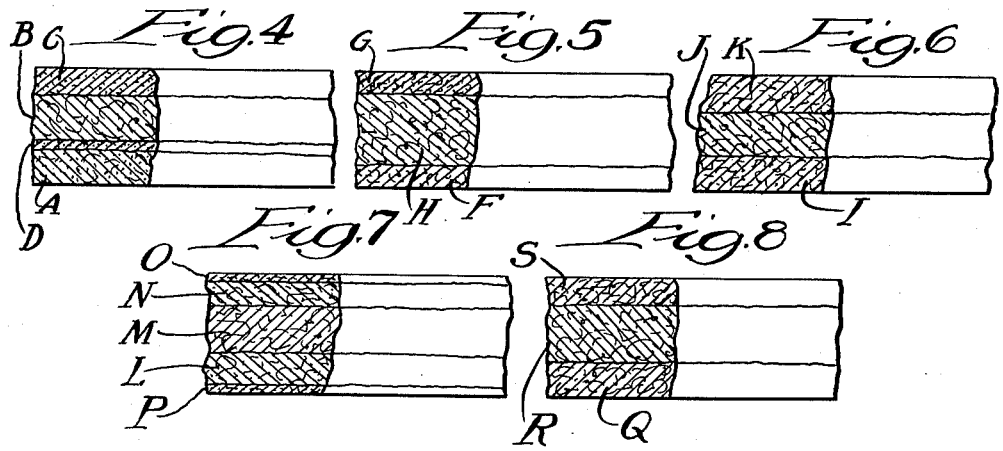
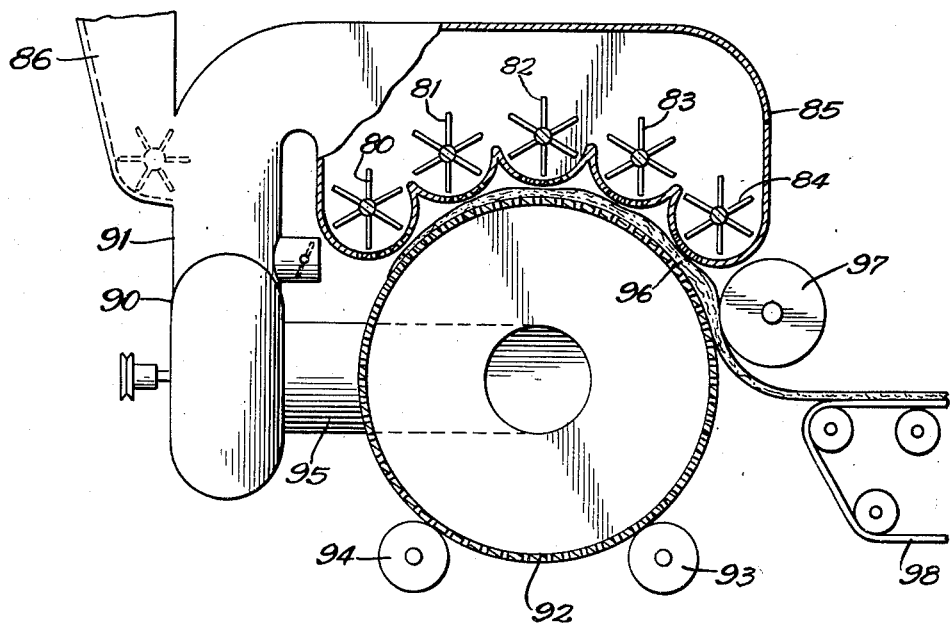
INVENTOR:
James d'A. Clark,
BY Dawson, Ores Brothers Spengenberg,
ATTORNEYS.

United States Patent Office 2,698,271
Patented Dec. 28, 1954

2,698,271

PRODUCTION OF THICK, LAMINATED, FIBROUS STRUCTURES

James d'A. Clark, Longview, Wash., assignor to A. B. Dick Company, Chicago, Ill., a corporation of Illinois Application August 13, 1949, Serial No. 110,212

8 Claims. (Cl. 154—101)

The present application relates to the art of air-felting thick, fibrous structures, particularly structures formed by superimposing a plurality of fibrous layers and pressing the laminate to form a consolidated product. The invention relates further to the fibrous structures formed by the practice of the herein disclosed method.

This application is a continuation-in-part of my copending application Serial No. 61,674 filed November 23, 1948.

Although for many applications it suffices to make boards and other consolidated fibrous structures from unitary felts of substantially uniform composition, for other purposes it is desirable to make them by consolidating felts composed of laminae differing from each other in fiber composition.

In order to provide a consolidated fibrous board of maximum stiffness and strength for a given density and composition, it is necessary to form it with surface layers having high strength in tension and compression, and with a core layer highly resistant to shear. This desirable condition obtains when the outer layers are composed of fine fibers, which are relatively long in comparison with their thickness, which have high intrinsic strength and which are well knit together, and, when the inner or core layer is composed of relatively thick fibers, preferably of irregular outline and randomly oriented. When such a board having its layers well adhered together is flexed, the long, fine fibers comprising the outer layers resist the tensile and compressive forces while the coarse fibers comprising the core layer lock together and impart to the board a high resistance to shear.

In other applications, it is desirable to provide a laminated fibrous product the laminae of which are not integrated to form a stiff, strong product, but rather are separated by slip planes permitting movement of the laminae relative to each other when the laminated product is subjected to bending stress. Such applications are found in the container board field where laminated boards having outer surface layers of a desired composition are bent, with or without preliminary scoring, to form containers of rectangular shape. In these applications, it is conventional practice to maintain at least two of the individual layers comprising the board separable from each other, as by interposing therebetween a layer of a suitable adhesive material. This permits slippage within itself or within the layers so that, during bending of the laminated board, a suitable adjustment of position between the layers may be made and, in this manner, prevent transverse fracture of the board.

The methods of the prior art for the production of laminated boards of the above types are distinctly deficient in providing products having optimum properties. In the conventional wet process wherein a plurality of fibrous webs are formed from an aqueous suspension of fibers and thereafter combined to form a laminated product, it is difficult to form a product which will lie flat and will not warp, particularly when subjected to varying conditions of atmospheric humidity. Furthermore, in the wet processes, there is a definite alignment of the fibers in the direction of flow of the conveying liquid, this orientation being augmented by surface tension forces which tend to draw contiguous individual fibrous elements into parallel alignment as the conveying liquid is removed. As a result, the random fiber orientation necessary to produce a board of equally high strength in the principal dimensions of length and width, does not occur and the crosswise strength of the board is affected adversely.

Other limitations attending the use of the wet process are the comparatively large weight of fluid that must be handled to lay the felt; the clotting unavoidably accompanying any effort to increase the fiber concentration in the aqueous suspending medium beyond about ½% by weight and up to a level of 2% (50 to 1 ratio) suitable for the rapid laying of thick, heavy felts; the difficulty of maintaining the fibers in uniform suspension in the conveying liquid; the necessity of employing large, heavy and expensive equipment; and the unsuitability of the process to the felting of very long fibers necessary or desirable for the production of certain types of laminated fibrous boards.

In contrast to the present invention, the requisites for the production of laminated boards of optimum properties are lacking in varying degree with the conventional dry felting methods. In the comparatively crude procedures in which fibrous material is dumped or sprinkled onto a forming surface from conveyors or from vibrating or rotating screens, the fibers are not entrained in an air stream and deposited uniformly over the surface of the forming element, nor are they deposited as individual fibers randomly oriented. Rather, they are in large measure deposited as fiber aggregates of varying size, resulting in thick and thin spots or, ultimately, spots of very high and very low density over the area. These factors make the consolidated board formed from the felt non-uniform and deficient in strength. Furthermore, it is particularly difficult by such procedures to form laminated felts wherein the laminae are maintained separate from each other by means of slip planes as desired in the manufacture of boards which subsequently are required to be scored and bent.

In certain other types of dry felting operations, the felt is laid by depositing fibers which are transported through a conduit by means of air, onto a conveyor which may pass over a suction box within the chamber, the conduit outlet and the suction box inlet being contained within the same chamber. Using a mechanism with such a suction box, it is not possible to prepare a suitable laminated felt since, if a sufficiently low concentration of fiber in the air were used as one of the requisite requirements for producing a uniform deposit, passage of the felt from one to the other of such chamber units as would be necessary to build up the laminae would normally result in the disruption of deposited fibers by a substantial volume of outside air being drawn by the suction box into the chamber through the orifices by which the felt enters and leaves so that previously deposited laminae would be disrupted.

The felting mechanisms of these chamber types are also characterized by the difficulties heretofore mentioned in connection with dry-felting apparatus of other types, namely inability to felt the fibers in the form of individual fibers, there being many clots, fibrous aggregates and thin spots present in the felt, and inability to orient the fibers randomly throughout the felt to provide a structure of maximum strength. Moreover, an added difficulty with any chamber unit is the building up of fiber deposits on the chamber walls and their breaking away from time to time with the subsequent incorporation of at least part of these deposits in the structure of the felt.

It is an important phase of the present invention that, by use of a plurality of the felt forming units described and claimed in my said copending application Serial No. 61,674 or by the modification herein described, there may be built up as desired laminated felts comprising a plurality of layers having any desired composition, which may either be interfelted to form a hard, stiff board as described above or maintained separate and provided with slip planes therebetween. When used in this manner, the forming units cooperate with each other, each performing its assigned function, to overcome to a significant degree all the defects pointed out above which heretofore have characterized the forming methods and apparatus employed in the art of making laminated fibrous products.

That the felting units referred to above are particularly well adapted for use with each other in the production of laminated felts will be apparent when it is realized that they provide for the first time all the conditions requisite to the rapid formation of laminated dry felts. In each felt-forming unit, the individual fibrous elements are separated from each other in the immediate vicinity of the place of deposit and just prior to their deposition. As a result, contact of the fibers with each other and the resulting formation of fibrous aggregates are minimized. This makes possible the formation of a laminated felt which, when consolidated, will be free from weak spots caused by the presence of fiber clots and, where such is desired, characterized by the presence of slip planes between the laminae, the latter not being keyed together by projections imparted to one of their adjacent surfaces.

Closely allied to the feature of providing a uniform flow of the fibers and fiber transporting medium over the fiber depositing area, is that of effecting the felting operation under substantially atmospheric pressure so that the movement of the fiber-entraining air stream is essentially undisturbed by a movement of outside air into or especially out of the felting area. A negative pressure in the air stream in the forming zone will cause outside air to be drawn in; however, if this negative pressure is produced by a substantial suction beneath the area of deposition, and by making this suction area extend beyond the zone of deposition, the suction can be arranged to hold the deposited fibers in position without being unduly disturbed by the incoming outside air. Furthermore, the clotting effect of cross currents produced by the incoming outside air under these conditions will be minimized if coarse or rigid fibers, which do not clot readily, are being felted.

The features of having the forming zone open to the atmosphere is of particular interest in connection with the production of laminated structures of high uniform quality at a good speed because a deposited layer of fibers may be passed beneath a succession of forming heads for the deposit of successive layers of fibers, without disturbing the lay of previously deposited fibers. The need for sealing rolls or the equivalent enclosing walls about the felting areas also is eliminated. These, if used, soon become coated with a thick deposit of fibers which occasionally break away as lumps or clusters and it is almost impossible to prevent at least part of these deposits from becoming incorporated as defects in the structures being formed.

Also of special significance in connection with the production of thick, laminate fibrous felts is the ability of the felting units to deposit the fibers completely unoriented and thus form a mat which may be consolidated into a strong board. For example, upon forming a mat by hand with cross cut wood fibers made in accordance with the copending application Serial No. 94,812, filed May 23, 1949, carefully sifting the fibers through a one-half inch mesh screen into a mold and using the utmost care, the resulting boards where consolidated, tested consistenly at least ten percent weaker than when felted with one of the units herein described. This result is especially significant in view of the fact that the cross cut fibers, because of their stiffness and coarseness, are among the easiest of fibers to form into a uniform felt.

Furthermore, the fibers may be deposited to form a felt in such a manner that the impact of the oncoming fibers and transporting medium have no disrupting effect on localized areas of the already deposited fibers. This is true even though air velocities of over 6,000 feet per minute are used. As a result, a speed of felt formation may be achieved which exceeds those presently possible in the manufacture of similar structures by the conventional paper or board machines, with the added improvement that the felts produced are composed of individual fibers in uniform distribution. The high production rate thus possible is of apparent importance in determining the suitability of the felting apparatus in the formation particularly of thick, laminated felts.

Not only does the high velocity of the fiber-transporting air stream permit a very rapid construction of the felt, but it also permits the formation of a laminated felt the component layers of which are interfelted to a very high degree. By virtue of their high momentum in the air stream, the fibers comprising a subsequent layer are driven more or less forcibly, depending on their size and stiffness, into the layer already deposited, thus interfelting the two layers and enabling the production of a strong, stiff product.

The felting unit providing these various advantages broadly comprises a circulating air system having a break through which is passed an endless foraminous felting surface. Means are provided for continuously introducing fibrous material into the air system, for disintegrating the fibrous material to individual fibers, for controlling the volume of air flow and rate of fiber deposition, and for maintaining conditions so that the fiber depositing zone is open to the atmosphere. The construction of the unit will be apparent from the accompanying drawings, wherein:

Figure 1 is a side elevation, partly in section, of apparatus which may be employed in the formation of laminated, thick felted structures in accordance with the present invention;

Figure 2 is a view in elevation, partly in section, of the apparatus of Figure 1, taken along the line 2—2 of that figure;

Figure 3 is a detail view of an alternate construction of details of a forming head for the apparatus of Figure 1;

Figures 4 to 8, inclusive, are elevational views of laminated, fibrous products which may be produced by the practice of the method of the present invention; and Figure 9 is a view in elevation of another type of apparatus which may be employed in the production of thick, fibrous structures by the method of the present invention.

As is evident particularly from Figure 1, the felting unit indicated generally at 10 comprises the head 11 which is a hollow, cylindrical member having a length substantially equal to the width of the felt it is desired to form and having also a perforated bottom portion 12.

The perforations in the bottom portion are adapted to pass individual fibers and preferably flare outwardly to facilitate passage of the fibers once they have entered the perforations. The perforations usually are spaced uniformly apart from each other and are sufficiently small to hinder passage of undesirably large fiber bundles or agglomerates. This condition is fulfilled when the inner openings of the perforations are less than one-half, perferably less than one-fourth, the mean fiber length. When the openings are spaced apart by a distance equal to at least one-half the length of the fibers, the two ends of a flexible fiber will be unable to enter adjacent openings and thus resist dislodging. In this manner, there is prevented the lodging within the felter head of a fiber serving as the nucleus for building up a fiber clot which might ultimately obstruct one or more of the openings in the head and thus prevent uniform fiber deposition of the felt, or which might be forced through one of the openings as a fiber aggregate or clot and thus constitute an imperfection in the felted structure. However, when the fibrous elements are not flexible, the spacing apart of the openings may be as close as desired.

To reduce the fiber clusters which may be within the felting head 11 to individual fibers having a size such as to enable their easy passage through the perforations in the head, there is provided within the head a paddle wheel agitator 13 or other means for beating the fibers or rubbing them against the interior surface of the head. The agitator may comprise a plurality of arms 14, each of which is provided with flexible tips or blades 15, the entire assembly being rotatably mounted on the shaft 16 driven by a suitable power source, not shown. The paddle wheel assembly preferably is mounted concentrically with the perforated section 12 of the felting head but eccentrically with respect to the top portions thereof. Hence the flexible blades will rub across the perforated surface or will move parallel thereto with a small clearance, but will not engage the fibers with the inner surface of the upper portion of the head. An agitator of the well known hammer-mill type of construction, with the tips of the swinging blades just missing the perforated surface may be suitable, especially for very coarse material.

To secure thorough disintegration of the fibrous material in the interior of the head, the agitator is rotated at a substantial speed. This may be, for example, at a speed sufficient to impart to the blades a circumferential speed of the order of from 500 to more than 2,000 feet per minute if the nature of the fibers require it, higher speeds being permitted where substantial vacuum is applied during felting of the disintegrated fibers, as will appear hereinafter.

Fiber is supplied to the interior of the felting head through the endless conveyor 20 feeding the hopper 21. This empties into the felting head through the air-locked, rotating feed mechanism 22. The fibers preferably are fed into the hopper 21 and hence into the felting head at such a rate that a uniform discharge may be obtained through the perforations without building up an excessive quantity of fibers within the head. Optimum operation is secured by adjusting the feed rate, the speed of the agitator, and the size of the holes in the felting head so that the inner surface of the perforated section of the latter is continuously covered with a moving layer of fibers.

The individual fibers produced by the agitator within the felting head are entrained and carried through the perforations therein by means of air or other gaseous entraining medium. This is generated by a system including the duct 25 for introducing the air into the interior of the felting head, the fan 26 passing air into the duct 25 and driven through pulley 27 from any suitable power source. The suction duct 28 of the fan preferably communicates with the suction box 29 situated a spaced distance below the perforated section of the head 11, and substantially coextensive with the air stream unless as is usual, it is desired to exert a positive holding force on a greater area of the felt, in which case suction boxes of correspondingly larger dimensions may be employed.

Hence upon operation of the fan 26, a stream of air is generated which passes through the duct 25 into the felting head 11 through the perforated section 12 of the latter, across an intervening open space into the suction box 29. From there it is returned to the fan via the suction duct 28. This stream travels at high velocity through the perforations of head 11, e. g. at a velocity of 6,000 feet per minute or more, although for coarse stiff fibers a lesser air velocity is satisfactory. In any case, the air stream is of substantially uniform velocity across the entire cross section of the foraminous section 12.

By regulating the flow of air, the pressure of the air stream between the felter head and the suction box may be maintained at slightly less than atmospheric pressure, so that a relatively slow inflow of air into the fiber entraining stream takes place from the surrounding atmosphere. Alternatively if enough suction (e. g. two inches of water or more) is provided beneath the deposited web to hold the fibers in position and over an area extending beyond the cross section of the air stream, the inward flow of air may be quite substantial. The desired condition may be realized by providing in the duct 25 a vent or bleeder valve 30 which preferably is placed on an inner wall of a bend so as to prevent the discharge of any fiber or solid materials which may be present in the effluent from the fan. However, instead of employing a vent in the manner indicated, the desired pressure differential may be secured by separating the ducts 25 and 28 and providing an exhaust fan for duct 28 and a blower for duct 11, the exhaust fan having the greater capacity and one of these preferably being operable at a variable speed, as is illustrated in connection with the felting unit 48, referred to hereinbelow.

The air is passed at a uniform speed through each of the openings in the foraminous section 12 of the felter head by restricting the dimensions and number of openings, and by establishing a sufficient pressure within the felter head. This pressure is about ¼ inch of water for relatively small production rates of the order of a few ounces of fiber per square foot of felt per minute using long fine fibers and felting head openings of small dimensions, or the pressure may be less than ¼ inch of water for large openings of say ⅜ inch diameter or more for very coarse long fibrous material to form a coarse structure at higher production rates of several pounds of fiber per square foot of felt per minute. It may, however, be increased to about ½ inch of water or more for higher production rates if the suction beneath the wire is correspondingly increased. These pressures result in an air velocity of the stream passing through the perforations of from about 500 feet per minute to over 6,000 feet per minute.

To collect fibers entrained in the air stream and passing through the openings in the perforated section of the felter head, there is interposed in the gap between the felter head 11 and the suction box 29 a foraminous fiber-collecting member. This may comprise an endless wire forming screen 35 of conventional construction driven by the lower couch roll 36, and passing around stretch roll 37, guide roll 38 and breast roll 39. The screen preferably is in close proximity to the mouth of the suction box 29 and a spaced distance from the felter head 11. To minimize fiber contact between the individual fibers entrained in the air stream after leaving the felter head, this spacing preferably is kept at a minimum. In practice, it is sufficient so that the air which issues from the perforations in the felting head as a multiplicity of individual jets has had the opportunity of merging and forming a continuous stream in the vicinity of the surface of the felted structure being deposited on the screen. The fibers then will be deposited uniformly throughout the felting area. The spacing between felting head and collecting screen may thus be a minimum of about two inches but, in the production of thick products, as in the formation of an eight inch felt, it preferably will be about ten inches or slightly more.

Further to control the deposition of fibers across the width of the foraminous collecting member, there may be provided means for closing off or diminishing the size of the openings in selected areas on the perforated surface of the felter head and on the top of the suction box. The means on the felter head may comprise (Figure 2) a plurality of strips 42 placed side by side against each other across the outer surface of the perforated section 12. The strips are relatively narrow and are slidably mounted against the exterior surface of the felter head by means of the bar 43. They also are curved or otherwise shaped to conform to the adjacent surface of the filter head; and each is provided with a projection or hand hold so that it may be adjusted by sliding it up and down to expose greater or smaller areas of the perforated section 12 as desired.

Alternately, the magnitude of flow of fiber through the felter head may be varied across its width controlled by providing a plurality of perforated strips 44 (Figure 3) placed adjacent each other across the entire perforated area of the felter head, the perforations in the strips being spaced and dimensioned so that, when desired, they may be placed in registery with those in the felter head. In this position, maximum flow of fibers is obtained. The flow may be reduced in a selected area, however, by adjusting a strip above that area, as by means of the screw 45, so that the perforations are offset slightly, thus reducing the effective area of the openings beneath the strip and diminishing correspondingly the flow of fibers.

By either of the above means, and also alternatively, by applying pieces of adhesive tape to cover selected areas of the perforations, the uniformity of fiber deposit along the width of the felt may be controlled precisely, since where it is apparent that for any cause fibers are being deposited in deficient quantity along a given segment of the felt, the strip immediately above such area may be adjusted to pass fibers in the amount necessary to build up the felt to the desired height. Similarly if the fiber deposit is too thick in a given area, this may be controlled by closing off perforations or reducing their size to cut down the fiber deposit in the given area by the desired amount.

Likewise, to control the position of the suction area and to a small degree control the thickness of the fiber deposit across the width of the felt, the suction box 29 may be provided with a plurality of strips 46 in side by side sliding relationship to each other. By adjusting the position of these sliding members, more or less of the area of the suction box 29 may be closed off or opened and the suction area varied as desired. In the usual situation and particularly along the direction of travel of the wire 35, the area of the suction box is extended beyond the area in which fibers are deposited so as to make the lay of the deposited fibers less susceptible to incoming outside air currents. If desired, as is usual when very thick fibrous deposits are laid for the double purpose of defining and supporting the vertical sides of the deposit and of preventing side air draughts from constricting or narrowing the airborne stream of fibers, boards 101 may be placed on edge along the sides of the suction area forming a trough into which the fibers are deposited.

To operate the felting unit described above, the fan 26 is set in motion, thus creating a stream of air passing through the duct 25, through the felting head 11, across into the suction box 29 and back into the fan. The paddle wheel agitator within the felting head then is activated and a controlled feed of fibers introduced into the hopper 21 and into the head. The rate of feed into hopper 21 is adjusted so as to cover the lower perforated surface of the felting head uniformly during operation without choking the head with fibers.

As the paddle wheel agitator revolves, the flexible tips thereon whack the fiber clusters or rub them against the perforated plate 12 thereby separating the clusters of fibers and forming substantially individual fibers. Carried by the air stream, these pass through the perforations into the zone between the felter head and the suction box. Since they are entrained in a relatively large volume of air, the tendency for them to bump against each other and develop into aggregates is minimized and they are deposited on the endless screen 35 substantially free from clusters and in random relationship to each other. During this operation, the vent 30 is adjusted so that a volume of air escapes from the system which is substantially equal to that drawn from the outside atmosphere into the suction box 29 and any leakage into the fan 26. In this manner, the air stream operating across the felter unit is maintained uniform and free from outgoing or uncontrolled incoming currents tending to disturb the lay of the fibers on the screen. The localized fiber deposition is controlled further by adjustment of the strips across the perforated area of the felter head and the extent of the suction box is varied in the manner heretofore explained.

In accordance with the present invention, I have adapted the felting unit described above to the production of thick, or laminated structures wherein a plurality of fibrous increments are deposited in successive increments one upon the other and the composite felt so formed is pressed into a consolidated structure. This is accomplished by providing an endless screen 35 of substantial length so that it may pass beneath a succession of felting units having a construction identical with or similar to that of the felting unit 10 and each of which deposits upon the screen a layer of predetermined thickness of a selected fiber.

Thus as illustrated in Figure 1, there may be provided three or more felting units, including the unit 10 together with the unit 48 and the unit 50, these being stationed at progressively greater distances from the screen 35 to accommodate the felt as it becomes progressively thicker. The chosen fiber then may be introduced into each of the units via its respective feeding mechanism. Operation of the units then will deposit upon the screen 35 a succession of layers of fibrous material. As the bottom layer, there will be deposited the fiber emanating from felting unit 10; as an intermediate layer that deposited by the felting unit 48; and as the top layer that formed by the unit 50.

The resulting composite felt then may be passed between the lower couch roll 36 and the upper couch roll 55, the latter being provided with weighted means 56 for varying the nip pressure between the two rolls. This compresses the web by an amount determined by the roll pressure and expands it laterally. Even slight lateral expansion will loosen the felt from the meshes of the wire screen 35 so that in its partially consolidated condition, it may be transferred to any suitable conveying mechanism 57.

If desired, the felt separating from the couch rolls may be placed between fibrous webs or sheets which, in turn, also may have been made in accordance with the process herein disclosed. Thus the upper sheet 58 feeding from roll 59 may be passed about the upper couch roll 55 so that it is applied to the upper surface of the web. Similarly the lower sheet 60 feeding from the roll 61 may pass about the rollers of the conveying mechanism 57 and, in this manner, be applied to the under surface of the felt. The entire assembly then may be consolidated to the required thickness and density by heating if necessary and pressing between rollers or in a platen press in conventional manner.

When the felting units are operating in normal manner and auxiliary means are not provided for keeping separate the individual layers, the layers comprising the composite felt will be interfelted and integrated to a substantial extent. This comes about as a direct result of the deposit of the fibers as individual fibers or individual fibrous elements oriented entirely at random with respect to each other, each successive felting unit simply continuing the felting operation although depositing fibers of a different type and driving them into the material previously deposited. This interfelting is desirable, for example, where it is sought to form a thick, stiff, strong board. The interfelting effect may be emphasized by providing between one or more of the felting units a slowly rotating picker roll 62 or other similar means for roughening the surface of the felt prior to the deposition of another fibrous layer from a succeeding felting unit.

When it is desired to maintain the individual layers comprising the composite felt substantially separate from each other, as where it is advantageous to provide slip planes therebetween, there may be incorporated in the apparatus one or more pairs of press rolls 65, 66 stationed between adjacent felting units and preferably provided with weighted means 67 for varying their pressure. When such press rolls are employed, it will be apparent that the felt will be compressed to an extent determined by the pressure applied and its surface made smooth by contact with the press rolls. Then when fibers are applied to the surface of the pressed felt by a subsequent felting unit, the fibers will not interfelt with the previously deposited to any substantial degree but will remain as a separate layer apart from the layer first deposited.

The separate character of the fibrous layers comprising the felt may be preserved and slip planes may be formed therebetween by interposing a discrete layer of adhesive or resin between the adjacent fibers layers. Thus there may be provided the spray head 70 between one or more pairs of the felting units and preferably subsequent to the press rolls 65, 66. The spray head is adapted to cover the pressed surface of the felt with a discrete layer of asphalt or other resinous or binding substance in any desired quantity. In place of or in addition to the spray heads for liquid any conventional means for adding a layer of powdered solid binder may be used. The resinous layers then will be covered with a fibrous layer of the desired thickness by the subsequent felting unit. In this manner, after the composite layers have been compressed there may be formed composite felted products having the layers individually substantially separate from each other by means of an asphaltic or plastic intermediate layer capable of cold flow so that the composite unit may be scored and bent without breaking the component fibrous layers.

Because after the binding substance has been applied to each intermediate layer it is necessary to keep the composite structure permeable to air so as to permit another layer of fibers to be deposited on its surface, it is not possible to apply a continuous layer of the binding substance to the felt except insofar as that the discrete particles so applied later may be fused or pressed into a more or less continuous layer during subsequent heating and pressing operations to which the structure is subjected. If a homogeneous completely continuous layer of binding or barrier material is required between the plies, then the material must be applied subsequent to the formation of all the felted plies. For example in Fig. 1, the upper ply 58 may be applied to the upper surface of felt just formed, subsequent to the felt being coated with a continuous layer of material on its upper surface after passing the last forming head 50, as, for example, by means of shower pipe 102.

Means also may be provided for incorporating a binder directly in the fibers prior to their deposition in the felt or contemporaneously therewith. Thus there may be provided the spray head 71 adjacent one or more of the felting heads and adapted to direct a spray of binder into the stream of fibers as they are carried downwardly from the felting head toward the stream. Contact of the spray with the individual fibers suspended in the entraining medium will coat most of them with the binder so that a uniform structure is obtained.

Alternatively, the binder may be introduced into the plies as a powdered solid via the hopper 72 provided with the worm feed 73 which is driven at a speed calculated to introduce solid binder into the interior of the felting unit at a predetermined rate sufficient to give the desired concentration of binder in the fiber. Thorough mixing of the solid binder and fibers then is obtained within the head during the agitation of the fibers by the paddle wheel situated therein.

If the powdered solid binder does not adhere well to the fibers and tends to sift through the deposited fibers, it may be deposited on top of the felt by a sifting mechanism of known construction subsequent to the deposition of the fibers and then subsequently distributed throughout the fibers by vibration of the machine or vibration especially applied to the web by any well known means.

It will, of course, be understood that, although the spray heads 70 and 71 and the adhesive feed mechanism 72, 73 have been described herein with particular reference to the intermediate felting unit 48, they are applicable individually or collectively to any or all of the felting units comprising the assembly.

Thus by using the method of the present invention, it is possible to build laminated fibrous structures rapidly and efficiently and having a wide range of characteristics. The structures may be of any practical thickness and composed of as many laminae as may be expedient. The individual layers may be integrated to form a stiff, strong board or they may be kept separate with slip planes in between. Adhesive binder may be incorporated directly into the fibers comprising a given layer, and the nature and amount of binder may be varied from layer to layer. Hence it will be possible to manufacture a laminated structure having a high binder concentration in one of the layers and a lower binder concentration in one or more of the other layers. In this manner, there may be selectively imparted to the various layers qualities of hardness, water resistance, flexibility, and other properties in any desired degree. Furthermore, the laminated product formed is adaptable to consolidation to any desired extent and by any desired means with or without being enclosed between paper or other fibrous sheets.

Exemplary of the structures which may be formed by the practice of the present invention are the boards illustrated in Figures 4 to 8, inclusive.

In Figure 4, there is illustrated a board formed by the operation of an apparatus substantially as depicted in Figure 1. It is composed of a bottom layer A, an intermediate layer B, and a top layer C of given fibrous compositions. The layer A is maintained substantially separate from the layer B by means of a layer D of resinous material in which are incorporated a few fibers from layer A. The layers B and C however, are integrated so that, in effect, they form a single layer. This construction is obtained by forming the fiber layer A by means of felting unit 10, pressing the layer so formed between rolls 65 and 66 to consolidate it and smooth the upper surface, applying a discrete resinous coating D to the upper surface of the layer by means of the spray head 70 and then depositing by means of the felting unit 45 the fibrous layer B of the desired thickness. The surface of this layer preferably is roughened by means of the picker roll 62 prior to deposition of the fiber layer C by the felting unit 50. This assists in interfelting and the fiber deposited by the latter unit will interfelt with the fibers of layer B so that, upon consolidation, integration occurs. Such a board is useful where a structural board is needed to prevent the penetration of a fluid from side A.

However, if a heavy continuous barrier D were required, it obviously would be easier first to deposit layer C then B then D then A. If made in this sequence and if layer A was merely a thin protective coat for the barrier D, the material of barrier D could be applied as a heavy continuous film and the fibrous or other material comprising layer A sprinkled thereon by any conventional means not requiring a flow of air through the previously deposited barrier and fibrous layers.

In Figure 5, there is illustrated a board in which the outer layers F and G are relatively thin and of a given fibrous composition, while the intermediate layer H is relatively thick and of a different fibrous composition. The outer layers may comprise, for example, relatively thin sections of highly separated, fine fibers while the intermediate layer may comprise a fixed layer of relatively coarse, thick, low cost fibers. This structure may be prepared by depositing from felting units 10 and 50 the finely separated fibers to form layers of the desired thickness and operating the felting unit 48 in such a manner as to deposit the coarse, thick fiber comprising the core layer. By avoiding compression of the layers between the felting steps, or especially by use of a picker roll therebetween, substantial interfelting of the layers may be obtained to form an integrated structure.

In this manner, there is formed a very stiff and strong structural board. The fine fibers on the exterior surfaces perhaps reinforced with an extra quantity of binder impart to it the necessary strength in compression and tension while the bulk of the thick, randomly oriented fibers comprising the intermediate layers perhaps containing less than the average quantity of binding material impart strength in shear to the product and gives good nailing qualities and impact resistance. Such a product is useful as a strong structural board.

In Figure 6, there is illustrated a board consisting of three layers composed of fibers having different properties as in Figure 4, but with each of the three layers I, J, K having a different fibrous composition. Such a board may be formed by introducing a fiber of a given and distinct type into each of the felting units 10, 48, and 50 and operating the units to deposit a layer of the desired thickness. Such a board is useful in a number of commercial applications, for example in the manufacture of table tops.

Still another type of board which may be produced by the practice of the presently described method is illustrated in Figure 7. This board is composed of three layers, L, M, and N formed by the respective units of the felting apparatus and composed of fibers of any desired kind. The fibrous layers may be integrated or maintained separate as expedient. The board is covered, however, by means of facing sheets or foils O and P which may comprise, for example, paper sheets. A board of this construction is formed by passing the composite felt emanating from the felting apparatus between the couch rolls 36, 55 to compress it slightly and separate it from the forming wire, and sandwiching the resulting product between the sheets or webs 58, 60 coated with an adhesive or barrier material by means of applicators 75, 76 of conventional construction. A board having a decorative outer surface, or other distinctive characteristics such as a water vapor barrier near the surface, may be formed in this manner.

In Figure 8, there is illustrated a laminated felt composed of three layers Q, R, and S. It may be made by incorporating a binding material of high flexibility such as a rubber latex together with the fibers in felting unit 10. A binding material of intermediate flexibility then may be added to the fibers in the unit 48 while a relatively hard binding material may be incorporated with the fibers in unit 50. In this manner, there will be formed fibrous layers which, even though integrated by interfelting will have different contents of binders of varying characteristics. When the resulting composite felt is heated to cure the binders with or without pressing, there will be formed a structure the various sections of which will have a flexibility corresponding to the binder embodied therein. In this manner, there may be manufactured fibrous structures having flexibility and hardness in selected segments as required to meet various specifications.

A particularly useful feature of the present invention that the method of felting may be applied not only to the formation of laminated structures but also to the formation of unitary felted structures of exceptional thickness formed at a high rate of speed. This may be accomplished by feeding to each of the felting units 10, 48, and 50 identical fibers and operating the units under substantially identical conditions. It is possible to build up a felt having a thickness of as much as ten or twelve inches at a speed which is very substantially greater than that obtainable by any of the conventional felting methods.

In the production of unitary felts, identical fiber may be supplied to each of the felting units through its independent feeding systems, or, by an appropriate adjustment of the construction, the individual felting units may be tied together and fed from a common source. In one such construction (Figure 9), a number of felting heads 80 to 84, inclusive, may be contained in a single housing 85 fed with fiber from the hopper 86. The construction and mode of operation of each of the heads is similar to that of the felting heads of the apparatus of Figure 1. Each is provided with a paddle wheel agitator having blades adapted to cooperate with a perforated plate, thereby separating the fiber clusters to individual fibers and then promoting their passage through the perforations in the plate with the air stream.

The fiber entraining medium in this case again is gaseous, as an air stream supplied by the paddle fan 90 which forces air into the duct 91 provided with bleeder valve 91a and communicating with the housing 85. The air stream then entrains the individual fibers added to the system or produced by the paddle wheel agitators in the heads 80 to 84, carries them through the perforations in the plates immediately adjacent thereto, and deposits them on a foraminous collecting surface. The collecting surface in this embodiment may be a foraminous cylinder 92 which revolves on the trunnions 93, 94 and which communicates with a suction fan, preferably the suction duct 95 of the fan 90.

Hence, as the air stream carries fibers across the space between the felting head 85 and the drum 92, the conditions being substantially as outlined hereinabove in connection with the multiple felting unit of Figure 1, fibers are built up on the surface of the cylinder over the entire area beneath the felting head. The web 96 thus formed is passed beneath the couch roll 97, is stripped from the cylinder 92 and passes by the conveyor 98 to any suitable consolidating mechanism. It will be apparent that such a construction lends itself to the very rapid fabrication of a uniform, dry felt of substantial thickness and superior qualities, by means of apparatus incorporating the advantages of simplicity of design and operation.

It is to be emphasized that the various advantages of the herein described method of forming thick, laminated fibrous structures are made possible only because of the cooperation of the various features of the method and the flexibility attendant upon its application.

The term "fibers" as used herein is meant to denote either ultimate, individually separate fibers of the material or unseparated fiber bundles comprising individual fibrous elements suitable for comprising part of the fibrous structure desired. By the term "mean fiber length" is meant the weighted average fiber length by weight as discussed in my publication in the Paper Trade Journal, vol. 115, No. 26, pp. 36–42 (December 24, 1942).

Having now described my invention in preferred embodiments, I claim as new and desire to protect by Letters Patent:

1. The method of producing a fibrous structure formed of a plurality of separately deposited layers of fibers interfelted into each other comprising the steps of forming a plurality of air streams unconnected with each other open to the surrounding atmosphere during travel from a separating wall to a collecting wall, passing each air stream first through a stationary separating wall having foramens dimensioned to permit passage of fibers and then through a collecting wall spaced a short distance from the separating wall and having foramens dimensioned to separate fibers from the air stream as it passes therethrough, entraining fibers in each air stream in advance of the separating wall and unconnected with fibers entrained in other air streams whereby separated fibers are carried through the separating wall and deposited on the collecting wall, passing the separating wall in continuous fashion through the separate air streams whereby the fibers build up in interfelted layers thereon, withdrawing a slightly greater volume of air through the collecting wall than passes through the separating wall whereby the area between the separating wall and the collecting wall may be allowed to remain open to the atmosphere while the deficiency of air is made up by a slight inflow of air from the surrounding atmosphere into the area between the walls.

2. The method of producing a fibrous structure formed of a plurality of separately deposited layers of fibers interfelted into each other comprising the steps of forming a plurality of air streams open to the surrounding atmosphere during travel from a separating wall to a collecting wall, passing each air stream first through a stationary separating wall having foramens dimensioned to permit passage of fibers and then through a collecting wall spaced a short distance from the separating wall and having foramens dimensioned to separate fibers from the air stream as it passes therethrough, maintaining a spaced relation between each separating wall and the collecting wall dimensioned to permit the air streams issuing from the foramens of the separating wall to merge into a continuous stream before contacting the separating wall, entraining fibers in each air stream in advance of the separating wall whereby separated fibers are carried through the separating wall and deposited on the collecting wall, passing the separating wall in continuous fashion through each air stream whereby the fibers build up in interfelted layers on the collecting wall, and withdrawing larger volumes of air through the collecting wall than passes through the separating wall associated therewith whereby air flows into the space between the separating wall and the collecting wall from the surrounding atmosphere so as to permit the collecting wall to pass in continuous fashion from one air stream to the other while remaining open to the atmosphere.

3. The method of producing a fibrous structure formed of a plurality of separately deposited layers of fibers interfelted into each other comprising the steps of forming a plurality of air streams unconnected with each other and open to the atmosphere during travel from a separating wall to a collecting wall, passing each air stream first through a stationary separating wall having foramens dimensioned to permit passage of fibers and then through a collecting wall spaced a short distance from the separating wall and having foramens dimensioned to separate fibers from the air stream as it passes therethrough, maintaining a spaced relation between each separating wall and the collecting wall dimensioned to permit the air streams issuing from the foramens of the separating wall to merge into a continuous stream before contacting the separating wall, entraining fibers in each air stream in advance of the separating wall and unconnected with fibers entrained in other air streams whereby fibers are carried through the separating wall and deposited on the collecting wall, passing the separating wall in continuous fashion through each air stream whereby the fibers build up in interfelted layers on the collecting wall, withdrawing larger volumes of air through the collecting wall than passes through the separating wall associated therewith whereby air flows into the space between the separating wall and the collecting wall from the surrounding atmosphere so as to permit the collecting wall to pass in continuous fashion from one air stream to the other while remaining open to the atmosphere, and maintaining the air stream at such high velocity as it passes through the separating wall that gravitational force will have no effect upon the carriage of fibers entrained therein.

4. The method of producing a fibrous structure formed of a plurality of separately deposited layers of fibers interfelted into each other comprising the steps of forming a plurality of air streams unconnected with each other and open to the surrounding atmosphere during travel from a separating wall to a collecting wall, passing each air stream first through a stationary separating wall having foramens dimensioned to permit passage of separated fibers and then through a collecting wall spaced a short distance from the separating wall and have foramens dimensioned to separate fibers from the air stream as it passes therethrough, entraining separated fibers in each air stream in advance of the separating wall and unconnected with fibers entrained in other air streams whereby separated fibers are carried through the separating wall and deposited on the collecting wall, passing the separating wall in continuous fashion through the separate air streams whereby the fibers build up in interfelted layers thereon, withdrawing a slightly greater volume of air through the collecting wall than passes through the separating wall whereby air flows into the area between the separating wall and the collecting wall from the surrounding atmosphere so as to permit such area to remain open to the atmosphere, and disintegrating the bundles of fibers in each air stream immediately in advance of passage through the separating wall so as to reduce fiber bundles to individually separated fibers for passage therethrough.

5. The method of producing a fibrous structure formed of a plurality of separately deposited layers of fibers interfelted into each other comprising the steps of forming a plurality of air streams open to the surrounding atmosphere during travel from a separating wall to a collecting wall, passing each air stream first through a stationary separating wall having foramens dimensioned to permit passage of separated fibers and then through a collecting wall spaced a short distance from the separating wall and having foramens dimensioned to separate fibers from the air stream as it passes therethrough, entraining separated fibers in each air stream in advance of the separating wall whereby separated fibers are carried through the separating wall and deposited on the collecting wall, passing the separating wall in continuous fashion through the separate air streams whereby the fibers build up in interfelted layers thereon, withdrawing a slightly greater volume of air through the collecting wall than passes through the separating wall whereby air flows into the area between the separating wall and the collecting wall from the surrounding atmosphere so as to permit such area to remain open to the atmosphere, disintegrating the fibers in each air stream immediately in advance of passage through the separating wall so as to reduce fiber bundles to individually separated fibers for passage therethrough, and maintaining the air stream at such high velocity as it passes through the separating wall that gravitational force will have little effect on the carriage of fibers entrained therewith.

6. The method of producing a fibrous structure formed of a plurality of separately deposited layers of fibers interfelted into each other comprising the steps of forming a plurality of air streams unconnected with each other and open to the atmosphere during travel from a separating wall to a collecting wall, passing each air stream first through a stationary separating wall having foramens dimensioned to permit passage of separated fibers and then through a collecting wall spaced a short distance from the separating wall and having foramens dimensioned to separate fibers from the air stream as it passes therethrough, entraining separated fibers in each air stream in advance of the separating wall and unconnected with fibers entrained in other air streams whereby separated fibers are carried through the separating wall and deposited on the collecting wall, passing the separating wall in continuous fashion through the separate air streams whereby the fibers build up in interfelted layers thereon, withdrawing a slightly greater volume of air through the collecting wall than passes through the separating wall whereby air flows into the area between the separating wall and the collecting wall from the surrounding atmosphere so as to permit such area to remain open to the atmosphere, disintegrating the fibers in each air stream immediately in advance of passage through the separating wall so as to reduce fiber bundles to individually separated fibers for passage therethrough, and feeding the fibers into each air stream at the rate of about one pound per 100 cubic feet of air to permit the separated fibers freely to tumble and turn about their axes with minimum contact between fibers as they pass with the air stream from the separating wall to the collecting wall.

7. The method of producing a fibrous structure having layers of fine fibers in the outer wall portions and layers of low cost, coarse fibers therebetween comprising the steps of forming a plurality of air streams which are unconnected with each other and open to the surrounding atmosphere during travel from a separating wall to a collecting wall, passing each air stream first through a stationary separating wall having foramens dimensioned to permit passage of fibers and then through a collecting wall spaced a short distance from the separating wall and having foramens dimensioned to separate fibers from the air stream as it passes therethrough, entraining fibers of fine denier and high intrinsic strength through the first and last air streams and coarse fibers of low cost in intermediate air streams therebetween, passing the separating wall in continuous fashion across the air streams whereby a layer of fine fibers are formed on top and bottom with layers of coarse fibers therebetween, and withdrawing larger volumes of air through the collecting wall than is passed with the fibers through the respective separating wall whereby a slight inflow of air from the surrounding atmosphere takes place between the separating wall and the collecting wall to permit the collecting wall to pass through the air streams while remaining open to the atmosphere.

8. The method of producing a fibrous structure having layers of fine fibers in the outer wall portions and layers of low cost, coarse fibers therebetween comprising the steps of forming a plurality of air streams, passing each air stream first through a stationary separating wall having foramens dimensioned to permit passage of fibers and then through a collecting wall spaced a short distance from the separating wall and having foramens dimensioned to separate fibers from the air stream as it passes therethrough, entraining fibers of fine denier and high intrinsic strength through the first and last air streams and coarse fibers of low cost in intermediate air streams therebetween, passing the separating wall in continuous fashion across the air streams whereby a layer of fine fibers are formed on top and bottom with layers of coarse fibers therebetween, withdrawing larger volumes of air through the collecting wall than is passed with the fibers through the respective separating wall whereby a slight inflow of air from the surrounding atmosphere takes place between the separating wall and the collecting wall to permit the collecting wall to pass through the air streams while remaining open to the atmosphere, and spraying binder particles into selected air streams in advance of passage through the collecting wall for deposition of such binder particles with the fibers on the collecting wall.

References Cited in the file of this patent

UNITED STATES PATENTS

| Number | Name | Date |
|---|---|---|
| 141,270 | Harrington | July 29, 1873 |
| 483,590 | Waibel | Oct. 4, 1892 |
| 1,786,669 | Manning | Dec. 30, 1930 |
| 2,028,388 | Gerard et al. | Jan. 21, 1936 |
| 2,086,757 | Williams | July 13, 1937 |
| 2,152,901 | Manning | Apr. 4, 1939 |
| 2,193,263 | Avery | Mar. 12, 1940 |
| 2,230,880 | Brown | Feb. 4, 1941 |
| 2,489,079 | Clark et al. | Nov. 22, 1949 |
| 2,543,101 | Francis | Feb. 27, 1951 |
| 2,569,765 | Kellett et al. | Oct. 2, 1951 |
| 2,577,784 | Lynam | Dec. 11, 1951 |

FOREIGN PATENTS

| Number | Country | Date |
|---|---|---|
| 422,226 | Great Britain | Jan. 8, 1935 |
| 608,252 | Great Britain | Sept. 13, 1948 |